(12) United States Patent
White, III

(10) Patent No.: US 9,259,847 B2
(45) Date of Patent: Feb. 16, 2016

(54) DEVICE FOR CAKE SLICING, DISPLAY AND TRANSPORT

(71) Applicant: David White, III, Chalmette, LA (US)

(72) Inventor: David White, III, Chalmette, LA (US)

( * ) Notice: Subject to any disclaimer, the term of this patent is extended or adjusted under 35 U.S.C. 154(b) by 212 days.

(21) Appl. No.: 13/853,685

(22) Filed: Mar. 29, 2013

(65) Prior Publication Data

US 2014/0290069 A1    Oct. 2, 2014

(51) Int. Cl.
  *B26D 3/24*    (2006.01)
  *A21C 15/04*   (2006.01)
  *B26B 27/00*   (2006.01)

(52) U.S. Cl.
  CPC . *B26D 3/24* (2013.01); *A21C 15/04* (2013.01); *B26B 27/002* (2013.01)

(58) Field of Classification Search
  CPC ......... A21C 15/04; B26B 27/002; B26D 3/24
  USPC ................................... 30/114–117
  See application file for complete search history.

(56) References Cited

U.S. PATENT DOCUMENTS

| | | | | |
|---|---|---|---|---|
| 367,689 | A * | 8/1887 | Wilson | 83/77 |
| 564,489 | A * | 7/1896 | Weidner | 30/443 |
| 1,297,671 | A * | 3/1919 | Fairbank | 33/525 |
| 1,442,679 | A * | 1/1923 | Baker | 30/114 |
| 1,679,004 | A * | 7/1928 | Pinkel et al. | 83/395 |
| 1,798,551 | A * | 3/1931 | Mocking et al. | 269/291 |
| 2,003,253 | A * | 5/1935 | Deutsch | 30/114 |
| 2,403,190 | A * | 7/1946 | Parraga | 30/303 |
| 2,560,271 | A * | 7/1951 | Block | 33/1 F |
| 2,716,814 | A * | 9/1955 | Lerner | 30/115 |
| 2,730,801 | A * | 1/1956 | Deedman et al. | 30/114 |
| 2,783,538 | A * | 3/1957 | Spevak | 30/116 |
| 3,132,678 | A * | 5/1964 | Steketee | 83/765 |
| 3,511,288 | A * | 5/1970 | Swett | A47F 3/145 206/45.2 |
| 4,100,676 | A * | 7/1978 | Ferguson | 30/292 |
| 4,197,940 | A * | 4/1980 | DeRossett | 220/780 |
| 5,129,159 | A * | 7/1992 | Fuenzalida | 30/114 |
| 5,446,965 | A * | 9/1995 | Makridis | 30/303 |
| 5,490,454 | A * | 2/1996 | Ancona et al. | 99/510 |
| 5,632,450 | A * | 5/1997 | Moor | 241/100 |
| 6,289,591 | B1 * | 9/2001 | Rodriguez | 30/124 |
| 6,698,336 | B1 * | 3/2004 | Siegel et al. | 99/340 |
| 7,480,999 | B2 * | 1/2009 | Atwater et al. | 30/289 |
| 7,658,010 | B2 * | 2/2010 | So et al. | 30/114 |
| 8,056,751 | B2 * | 11/2011 | Vovan | B65D 21/0222 206/508 |
| D657,209 | S * | 4/2012 | Getzinger et al. | D7/698 |
| D658,012 | S * | 4/2012 | Dagan | D7/610 |
| 8,151,674 | B2 * | 4/2012 | Baeten et al. | 83/13 |
| 2005/0051010 | A1 * | 3/2005 | Lee | B26D 3/24 83/410.9 |
| 2006/0180031 | A1 * | 8/2006 | Carlson et al. | 99/352 |
| 2006/0182861 | A1 * | 8/2006 | Arend | 426/518 |
| 2013/0036882 | A1 * | 2/2013 | Getzinger et al. | 83/23 |
| 2014/0290068 | A1 * | 10/2014 | Tarquinio | 30/114 |
| 2014/0290069 | A1 * | 10/2014 | White, III | 30/114 |

FOREIGN PATENT DOCUMENTS

DE    10 2004 036 053 A1 *   2/2006

* cited by examiner

*Primary Examiner* — Hwei C Payer
(74) *Attorney, Agent, or Firm* — Leininger Patents

(57) ABSTRACT

The device is used to slice, store, display or transport cakes. It is primarily composed of four elements; a cutter, a holder, an alignment tray and a holder tray which combine for performing various features of the invention. The device is useful for birthdays, general storage, restaurants or parties.

11 Claims, 10 Drawing Sheets

DEVICE FOR CAKE SLICING, DISPLAY AND TRANSPORT

CROSS-REFERENCE TO RELATED APPLICATIONS

This application claims priority to U.S. provisional patent application 61/688,409.

STATEMENT REGARDING FEDERALLY SPONSORED RESEARCH AND DEVELOPMENT

Not Applicable

REFERENCE TO A "MICROFICHE APPENDIX"

Not applicable

BACKGROUND OF INVENTION

1. Field of the Invention/Technical Field

The present invention is in the technical field of cutlery.

2. Description of Related Art/Background Art

There exist varieties of cutters, knives and other implements that can be used to slice cakes and other baked goods. A search of prior and related art resulted in the following patents:

U.S. Pat. No. 2,403,190 is a cake cutter that is comprised of three major components: a frame, a cutting implement and a pressure device. The frame is generally circular, with a heavy cross-section, and outfitted with a number of sets of short, upwardly pressed fingers or tongues along the inside. The radial cutting implement, in this case one continual piece of fine wire, is welded to the frame at each end, strung around the fingers or tongues, and welded or soldered at the center point, to create equally spaced radial portions that form cutting elements.

Pressure can be applied to the cutting implements either by use of handles that are attached to the frame or by use of a "special device". The special device is comprised of a central connector piece from which four identical arms radiate outward and downward at a 90 degree angle. The end of each arm forms a horseshoe shape which affixes to and enables pressure to be placed on the frame, and subsequently the cutting implement. Also protruding directly downward from the center of the connector piece is a pin that pierces the cake and works to stabilize the special device. Since U.S. Pat. No. 2,403,190 was created before the advent of more modern construction materials, it is somewhat bulky in design, as well as cumbersome to use and clean. It also does not provide for the storage and display of cakes.

US Patent Application 2009/0282990 A1 is a food cutting apparatus comprised of three main parts: a base, a cutter assembly and a cover. The base is a surface with two sections extending upwards to form sidewalls, and two openings at the base surface in between the sidewalls. The center of the base is formed into a concave seat where food items are placed to be cut. A spike or barb protrudes from the epicenter of the seat to hold said food item in place. The seat itself is split by slots into which the blades from the cutter assembly fit. The slots also double as a drain for fluids of the recently cut food item. (eg. apple, tomato, etc.). The cutting assembly is comprised of a ring with two vertically protruding handles, and blades. The blades, molded on one end to the ring, and intersecting and molded together on the other end, are situated such that the cutting edges face the base. The handles fit into the openings of the base surface in between the base sidewalls US Patent Application 2009/0282990 A1 is best utilized as a cutter for fruits and vegetables, not for baked goods. The concave seat, blade slots, barbed spike and drainage system are not conducive to the effective slicing and display of cakes and other baked goods. U.S. Pat. No. 5,129,159 is a cake divider comprised of a cylindrical center base with radiating blades and a removable knob top. The cylindrical center base is situated vertically and has twenty-four blades radially attached at the bottom end. The blades are equally spaced with the cutting end facing downward. The top end of the center base rises three inches vertically above the blade tops and is threaded at its apical end to connect with the knob. The knob is circular with a solid top and threaded on the bottom to connect with the center base. Pressure is placed upon the knob in order to force the blades downward to cut the cake or pie into twenty-four equal pieces. Once U.S. Pat. No. 5,129,159 has cut sliced the cake, it can be left in place to double as a display. The knob may be unscrewed and replaced with a flat plate onto which objects (candles, figurines, etc.) can be placed for aesthetic purposes.

U.S. Pat. No. 5,446,965 is similar to U.S. Pat. No. 5,129,159 in that it is a cake divider comprised of a cylindrical center base with a plurality of radiating divider arms and a removable cap. The major difference is that U.S. Pat. No. 5,446,965 allows for the removal and attachment of the blades. The hollow cylindrical center base of U.S. Pat. No. 5,446,965 contains a plurality of slots equally spaced around its circumference, on both the apical (twelve slots) and basal (eight slots) ends. The divider arms are formed such that each contains a cutting blade on the lower edge and a tab that is molded to fit into the center base slots. Either end of the center base can be fitted with divider arms. The cap is placed on the end that is not engaged with the divider arms. Pressure is placed upon the cap in order to force the mechanism downward to cut the pastry. Since there is no centering device or way to stabilize the pastry, it is conceivable that shifting may result in uneven slicing. Also, since the center base is hollow to allow for the attachment of the divider arms, a hole the size of the base's diameter will be cut in the center of the pastry, resulting in disfigurement and waste.

U.S. Pat. No. 5,983,503 is a cutting utensil comprised of a cruciform blade device that is mechanically attached to a central shaft and housing unit, and a handle. Additional uniform blade arms are permanently attached to and radiate from the cruciform blade center in order to cut eight pieces of flat food products. The cruciform blade is perpendicularly attached to the central shaft. The handle is attached to the apical end of the central shaft. A spring encircles the central shaft from the top of the cruciform blade to the bottom of the handle. The spring enables the cruciform blade to retract into the housing unit. When downward pressure is applied to the handle, the cruciform blade device is forced out of the housing and through the food, thereby slicing the item. When the pressure is lifted, the cruciform blade retracts back into the housing unit. Since U.S. Pat. No. 5,983,503 has no stabilizing or centering device, the cutting device may shift, causing uneven slices. Also, when pressure is applied to the cutting device and the crucible blade is cutting, the housing unit rests on the surface of the food item causing unsightly marks. Lastly, due to its mechanism of action, U.S. Pat. No. 5,983,503 is limited to use for flat baked goods since it would cause significant smashing of thicker food items such as layer cakes or pies with toppings.

U.S. Pat. No. 6,745,660 B2 is an apparatus for cutting baked goods that is comprised of a baking pan and a straight edge ruler. The baking pan consists of a bottom section that is wholly attached to a peripheral side section. The edge of the side section is outfitted with a number of pegs that run along the circumference. The straight edge ruler is of sufficient length and has a linear cut out running the interval of its center so that it may be coupled with the side section pegs to act as a guide for cutting baked goods. An embodiment of U.S. Pat. No. 6,745,660 B2 describes a pan insert of similar construction and mechanism of action which can be used in conjunction with a regular baking pan. U.S. Pat. No. 6,745,660 B2 does not function as a food slicer but rather as a guide that needs to be used in conjunction with a knife or other similar implement to cut slices. It also does not provide for the aesthetic display of cakes.

BRIEF SUMMARY OF INVENTION

The invention is a multifunctional cake cutting device that facilitates the easy cutting of cakes and other baked goods into clean and equal slices. The invention also provides for the sanitary storage and display of the food product.

It is an object of the invention to provide an apparatus to easily cut cakes into neat and equal slices.

It is a further object of this intervention to provide an easily washable cutting mechanism by having a singular cutter device, instead of multiple cutting blades.

It is a further object of this intervention to provide a cutter device with a blade stabilizing circle and thin stable blades, for sturdy precise cutting.

It is a further object of this intervention to provide cut markers to act as a guide for measuring equal slices and half slices.

It is a further object of this intervention to provide finger and thumb indents for the easy removal of the cover component.

It is a further object of the intervention to provide sloped slicing arms to as a guide for the placement and removal of the cover portion.

It is a further object of the intervention to provide a sealing gasket to facilitate the secure fastening of the cutter device and the cover, thereby ensuring the maintained freshness of the food product.

DETAILED DESCRIPTION OF THE INVENTION

Figure 1:
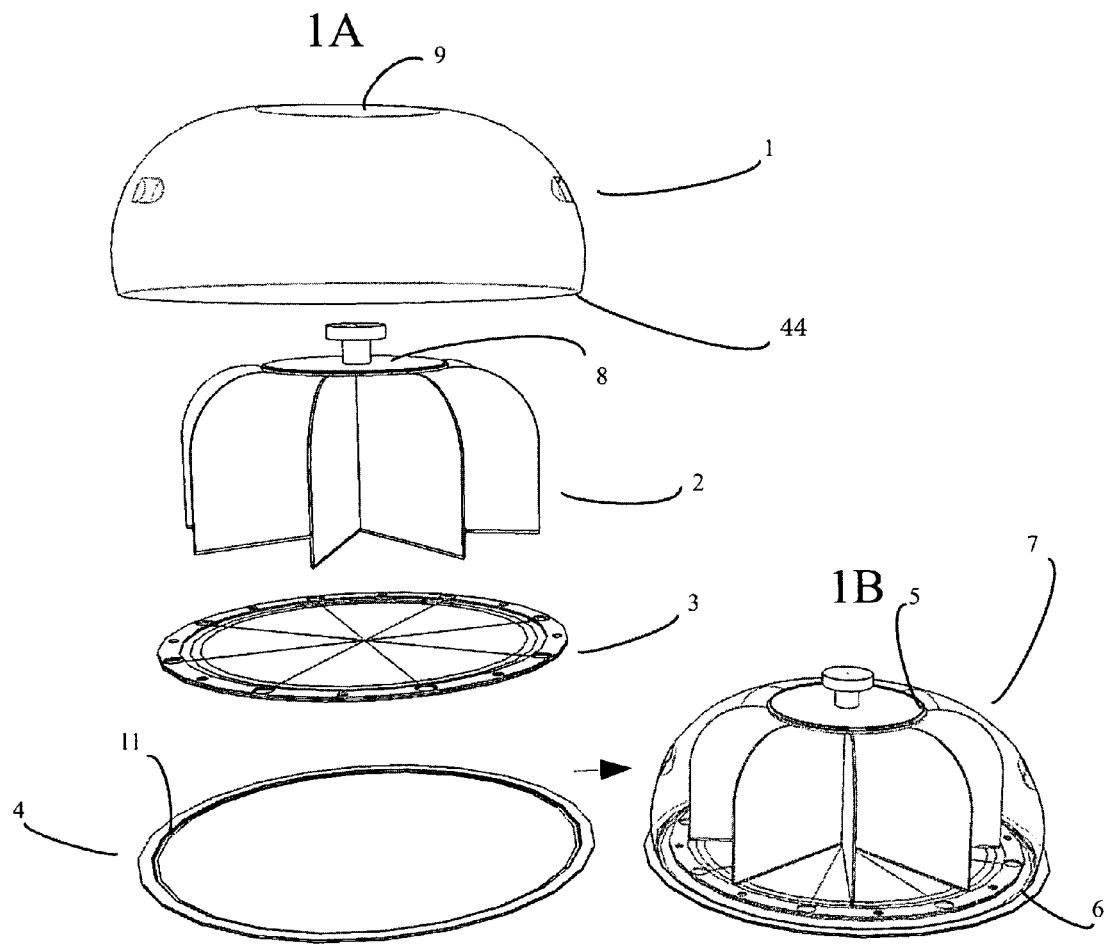
FIG. 1. An exploded view (1A) and a combined view (1B) of the four main components of the invention showing their operational relationships.
Figure 2:
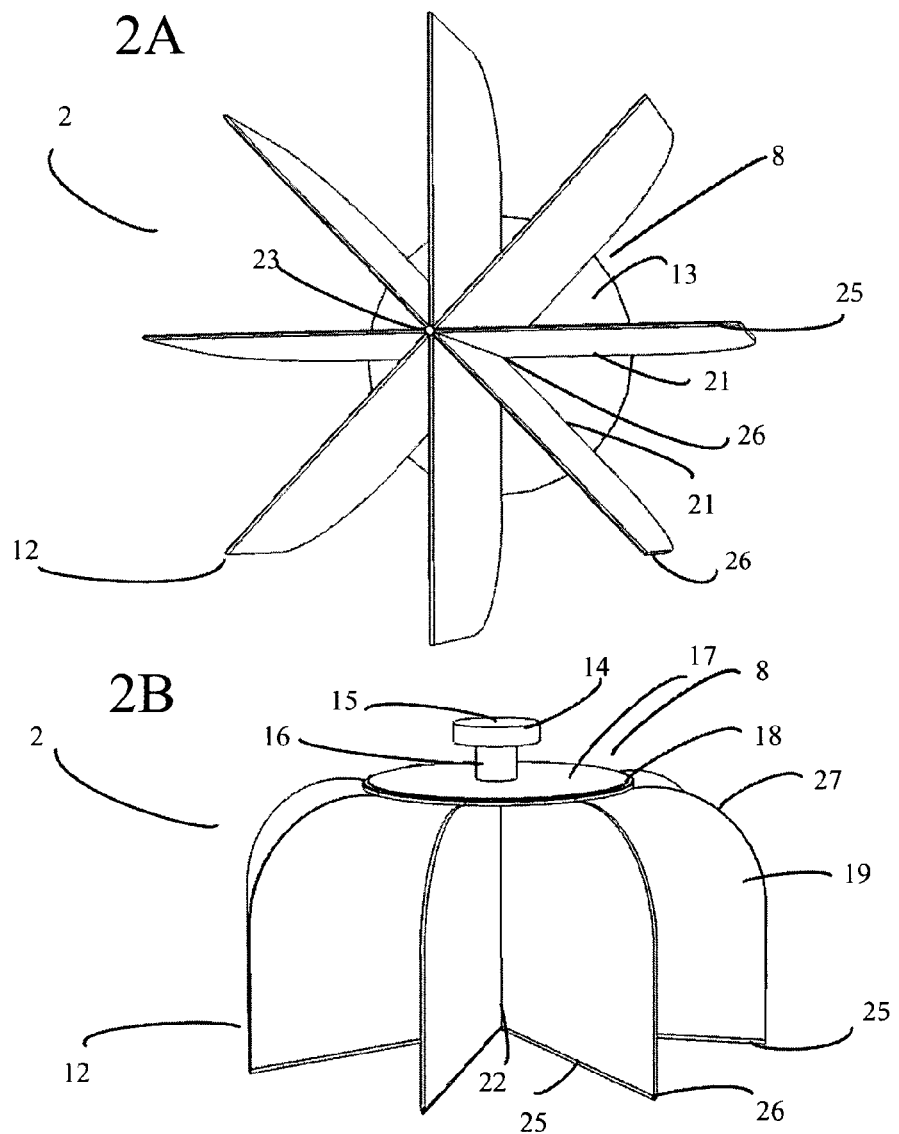
FIG. 2. A ventral view (2A) and a lateral perspective view (2B) of the cutter component showing its sub-component features and structure.
Figure 3:
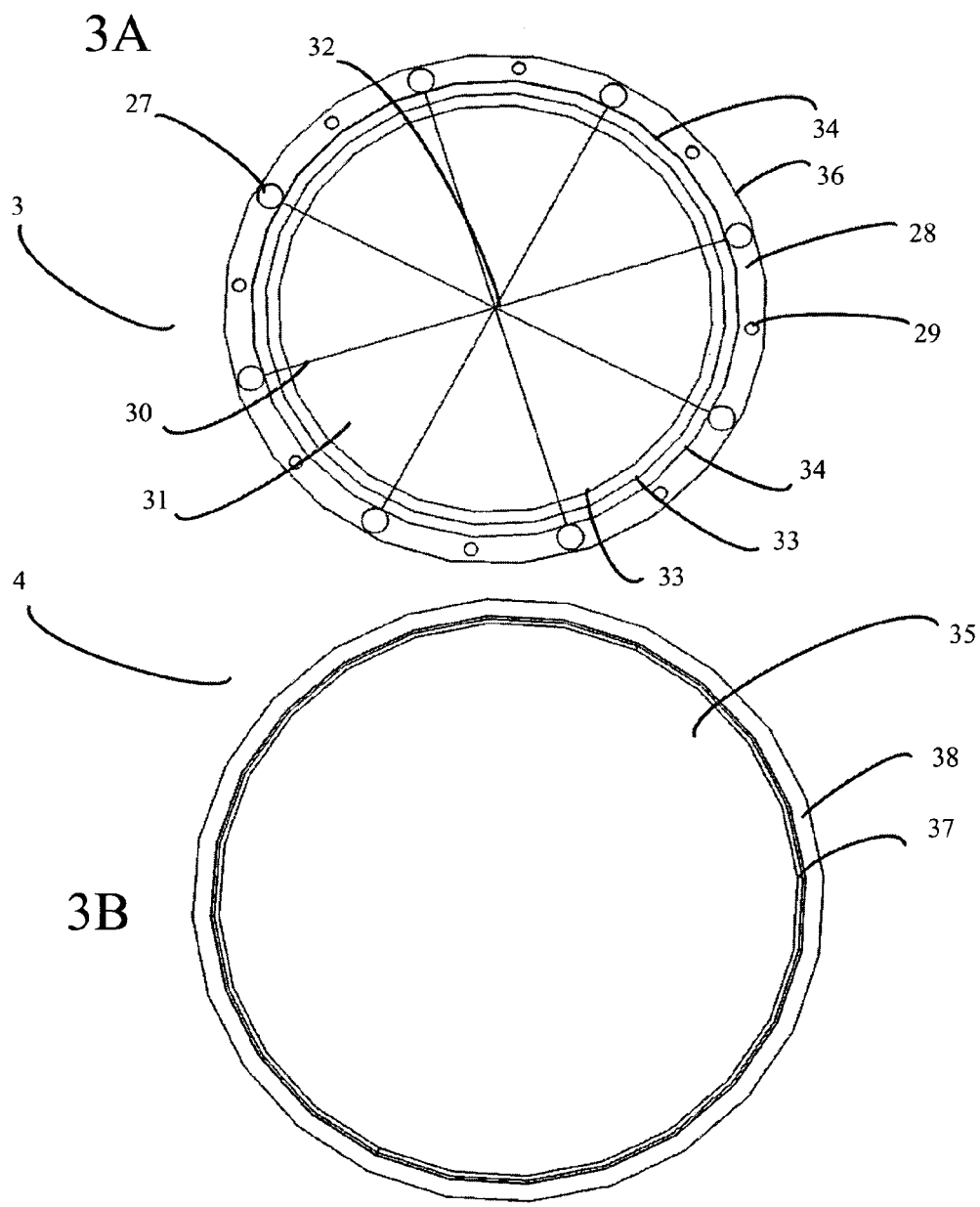
FIG. 3. A birds eye view of the alignment tray (3A) and the holder tray (3B) components showing their features and structure.
Figure 4:
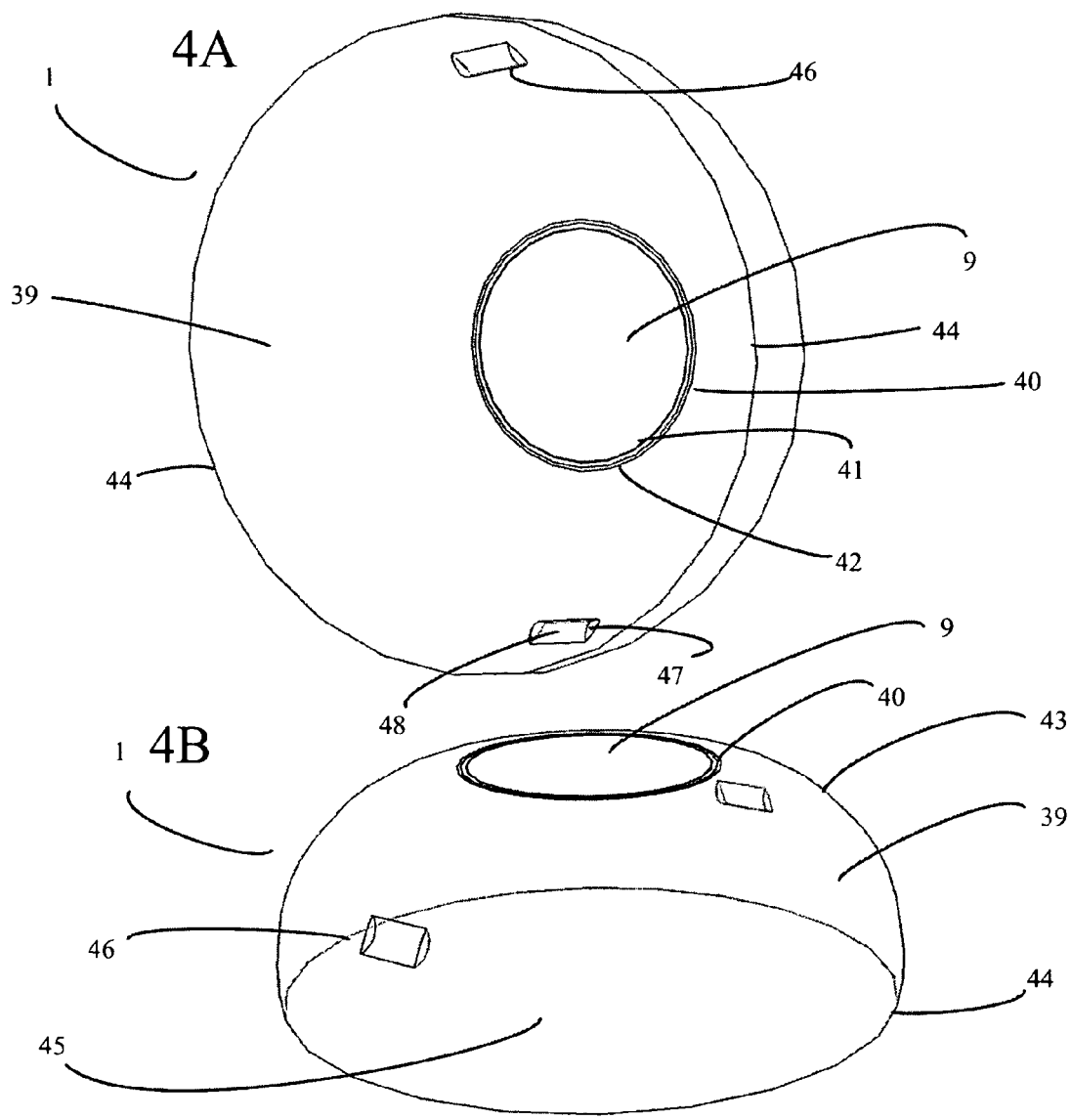
FIG. 4. A ventral view (4A) and a lateral perspective view (4B) of the holder component showing its sub-component features and structure.
Figure 5:
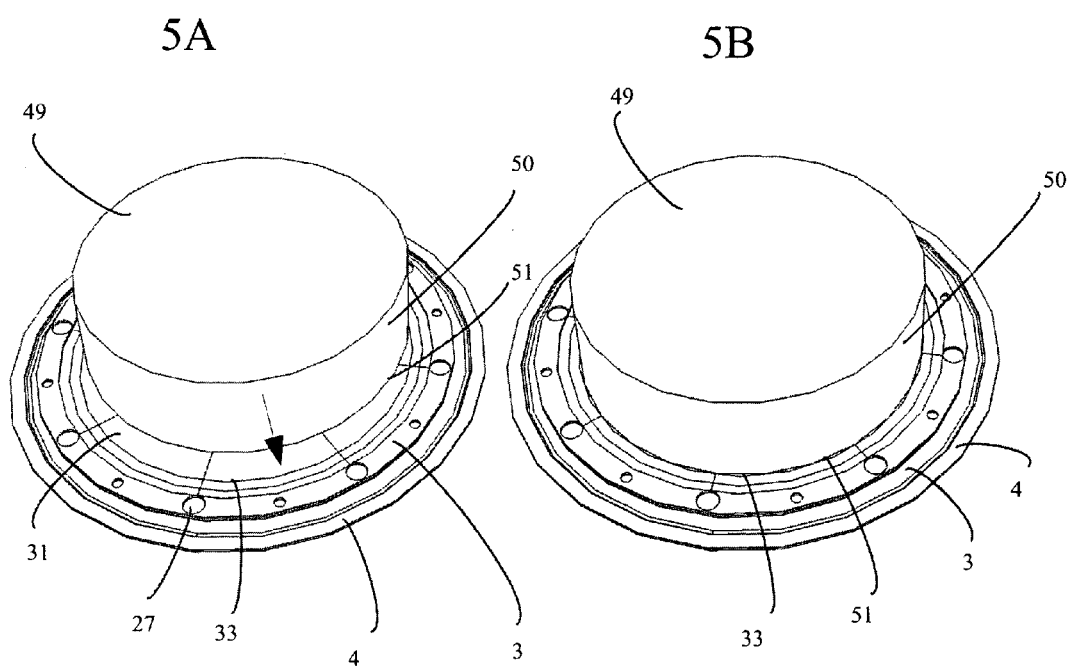
FIG. 5. A perspective time-lapse view of a cake atop the alignment tray and holder tray. The cake is initially misaligned (5a; wherein the arrow indicates the direction of motion necessary to align the cake) and is subsequently aligned (5B) on the alignment tray.
Figure 6:
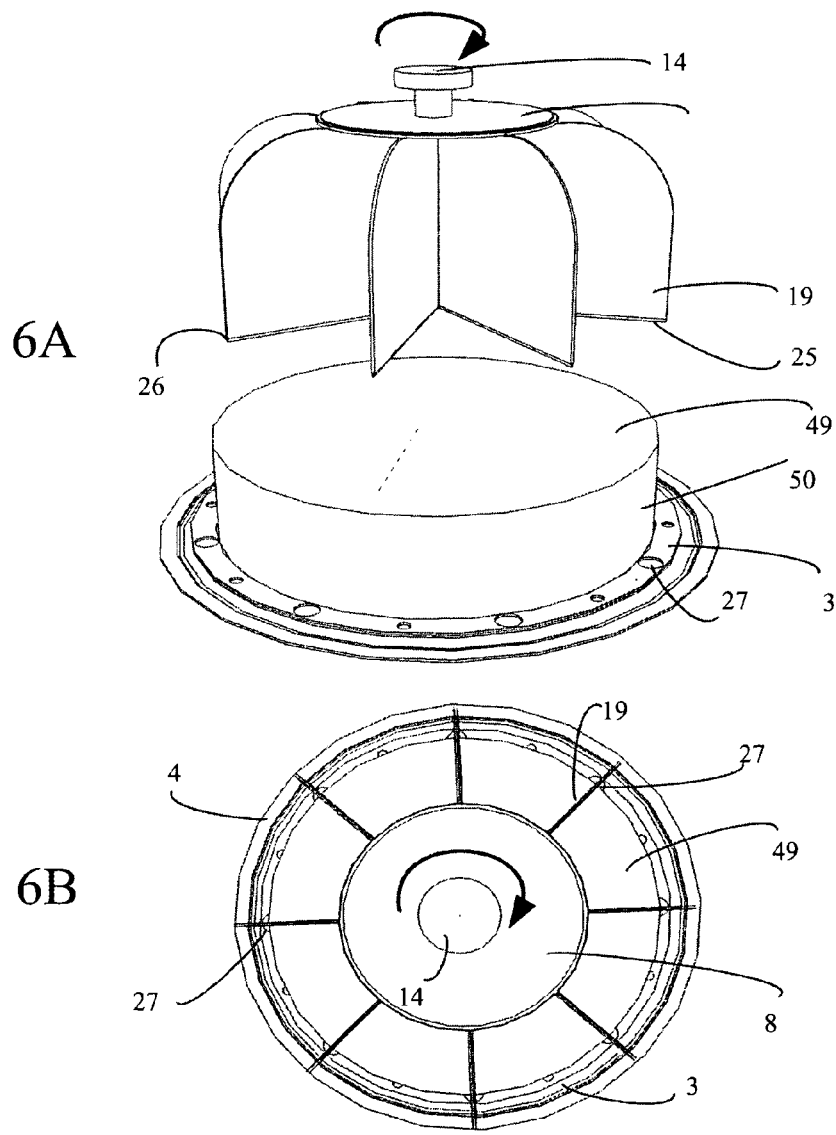
FIG. 6. A time-lapse view of a cutter initially misaligned (6A) with the markers of the alignment tray (the dashed line indicates the cutter misalignment and the arrow indicates the direction of rotation needed for alignment). The cutter is subsequently rotated (6B; arrow indicates direction of motion needed) into alignment with the markers as indicated by the birds eye view in 6B.
Figure 7:
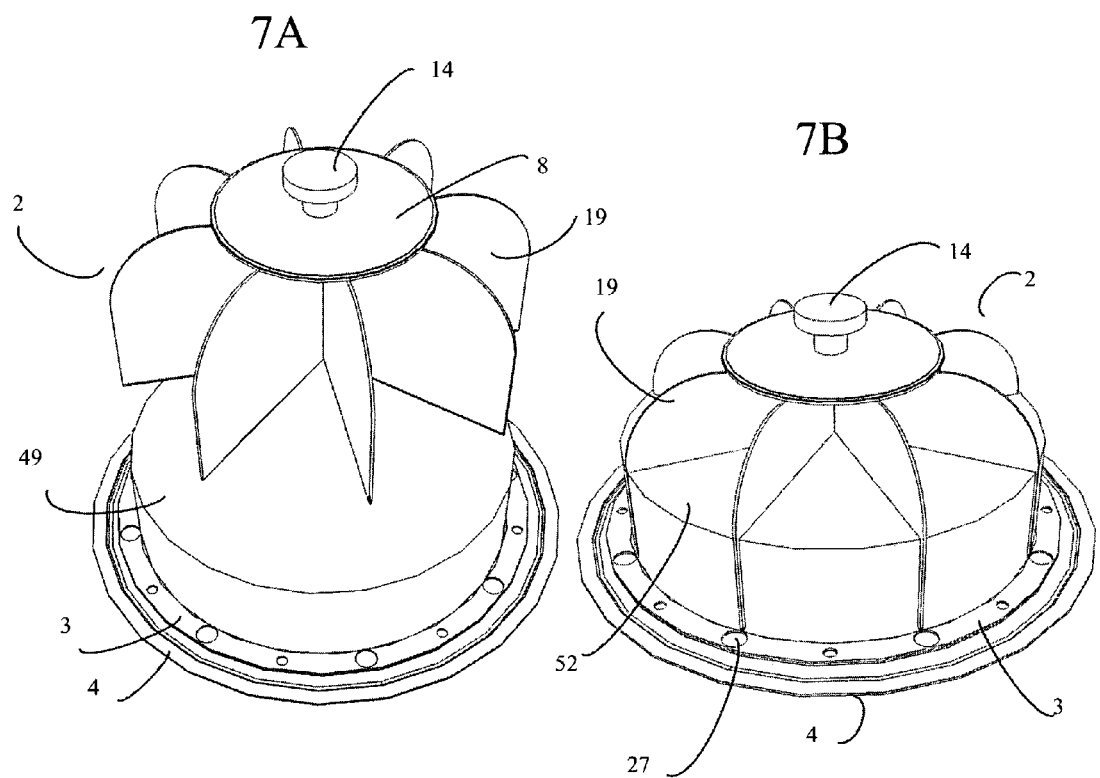
FIG. 7. A time-lapse view of a cutter initially positioned above a cake to be sliced (7A) and a subsequent downward motion that slices the cake (7B).
Figure 8:
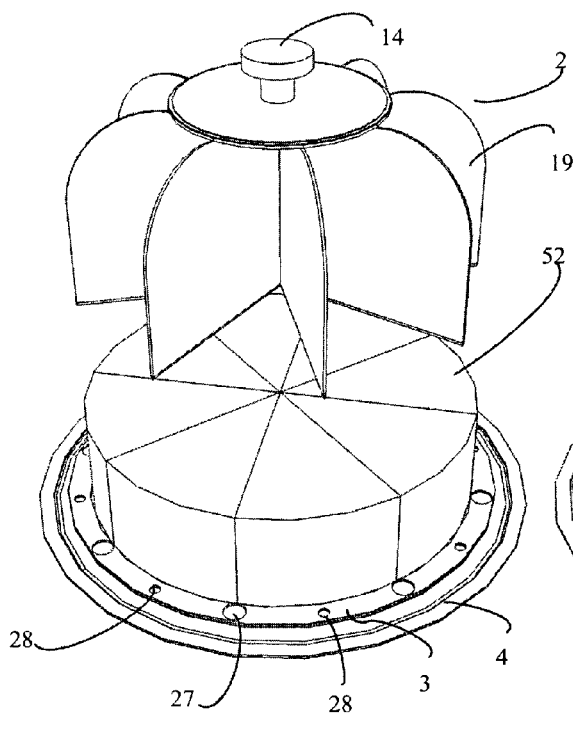
FIG. 8. A time-lapse view of a cutter positioned (8A) above a cake and aligned with the secondary markers in order to subsequently re-slice the cake in to smaller pieces (8B).
Figure 8:
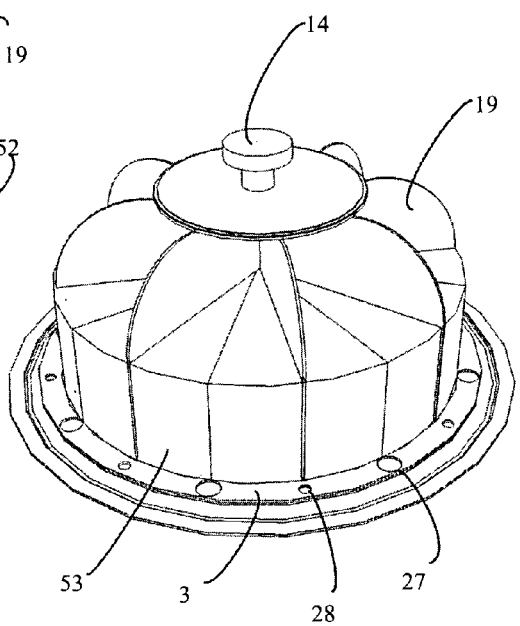
Figure 9:
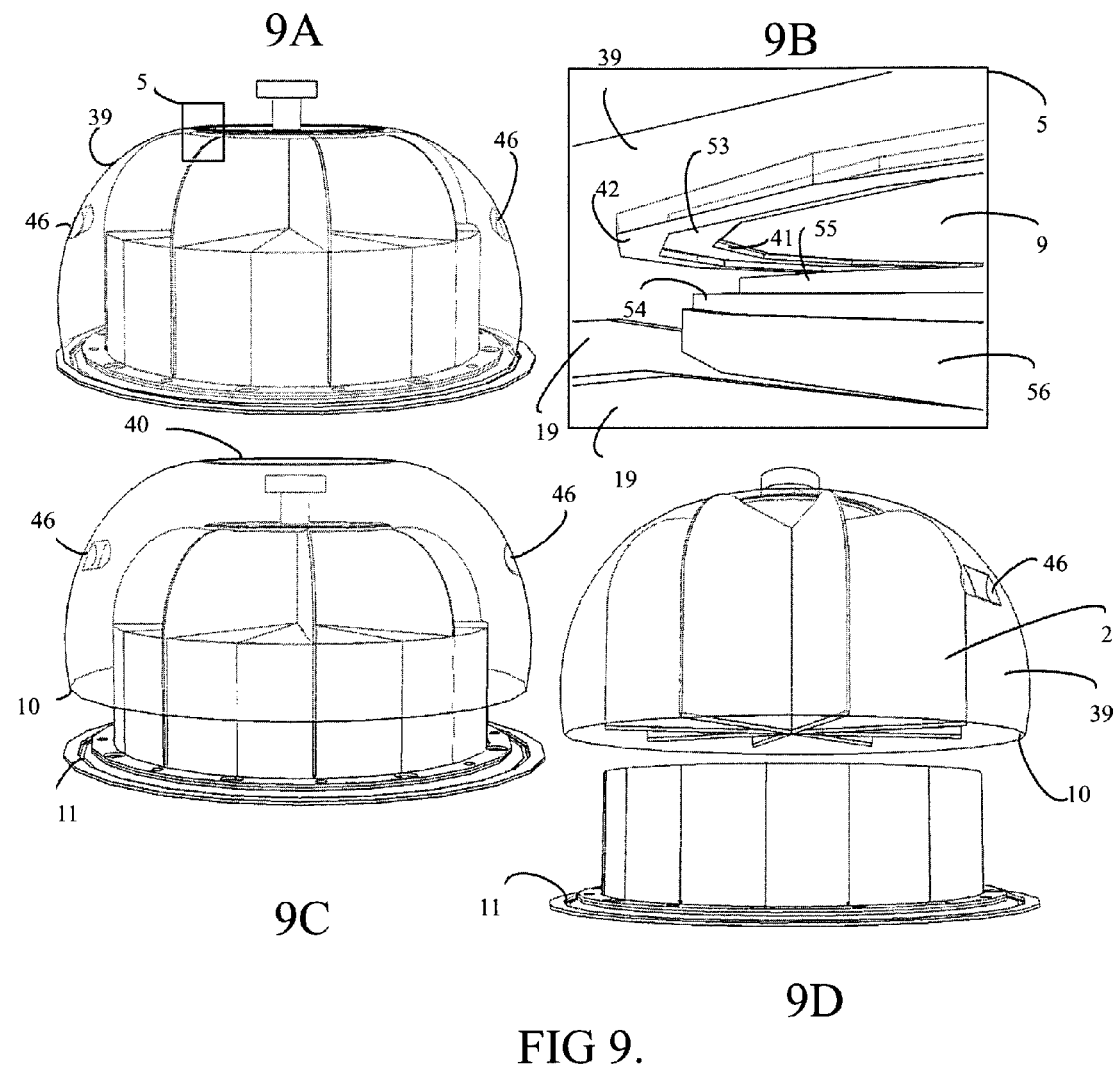
FIG. 9. A combination of views in order to show the relationships of the component junctions to operation of the invention. A combined view (9A) shows a sealed device, where the inset (black box) refers to (9B) which details the components that make the cutter/holder connection junction. When removing the holder, breaking both junction seals on the holder (9C) results in a different display than breaking one junction seal on the holder (9D).
Figure 10:
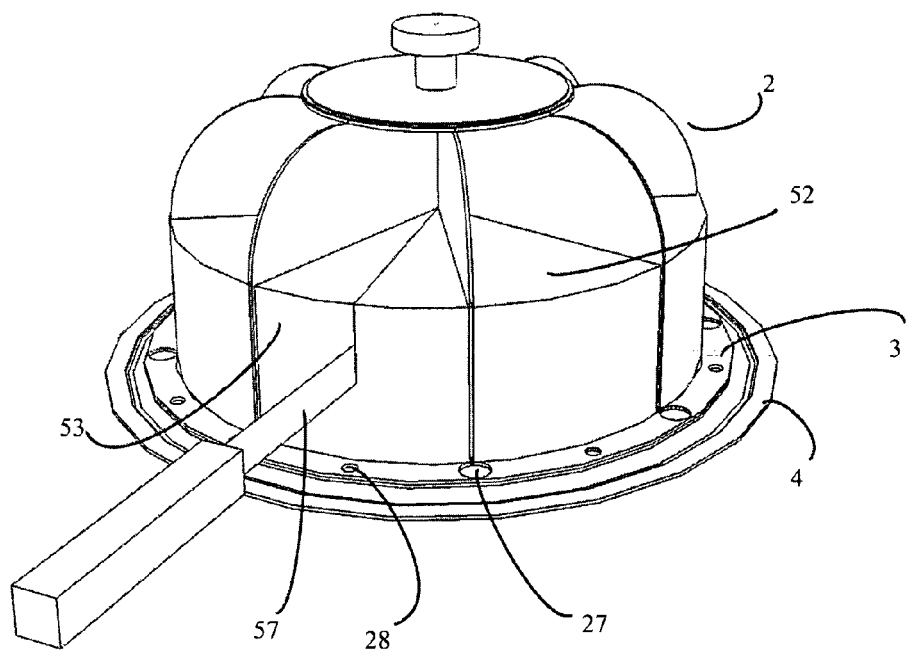
FIG. 10. A perspective view of the cutter and alignment tray being used to manually determine the size of a cake slice.

The preferred embodiment is comprised of four main components: a translucent holder 1, the cutter 2, the alignment tray 3 and the holder tray 4. The pieces are operationally arranged in a vertical stack in the following order, from bottom to top: the holder tray 4, the alignment tray 3, the cutter 2 and the holder 1. There are two connection junctions 5, 6 which allow the components of the invention to be combined into one element 7 in order to store, display, or transport the invention. The first connection junction 5 is between the holder 1 and the cutter 2 at the edge of the blade stabilizer circle 8 of the cutter 2 and the holder center hollow cut out 9. The second connection junction 6 is between the ventral lip 44 of the holder 1 and the lateral lip 11 of the holder tray 4. In order to combine the elements into, the first connection junction 5 must be secured and then drawn toward a combination of the alignment tray 3, which sits upon the holder tray 4 and subsequently the second connection 6 must be secured. In another embodiment, the holder tray 4 and the alignment tray 3 may be combined into one piece. In yet another embodiment, the cutter 2 and the holder 1 may be combined into one piece. In yet another embodiment, the holder tray 4 and the alignment tray 3 may be combined into one piece and the cutter 2 and the holder 1 may be combined into one piece In the preferred embodiment, the cutter 2 is comprised of a disk shaped blade stabilizer circle 8 with a blade unit 12 affixed to its underside 13. The blade stabilizer circle 8 has a knob 14 with a dorsal grasping surface 15 and ventral connecting unit 16 centrally affixed to the blade stabilizer circle topside 17. The radius of the blade stabilizer circle 8 is optimally thought to be half the radius of the alignment tray (about 5"), though it may range from 2"-8". The optimal radius will allow for maximize stabilization of the blade unit and also allow maximum visibility from above. It may be from 1/16" thick to 1/2" thick to allow for stability during cutting. It may also be transparent to allow maximum visibility during cutting or display. The blade stabilizer circle 8 may be composed of different types metals, plastic polymers, synthetic rubbers or moldable resins.

The blade stabilizer circle 8 is rimmed by the blade stabilizer circle edge 18, forming one half of the first connection junction 5, when attached to the holder 1. The slicing arms 19 of the blade unit 12 has ventral sharpened blade edges that face downward and are used for cutting. The top side of the blade unit 12 is centrally affixed to the blade stabilizer circle 8 at a plurality of dorsal blade junction intersections 21 and extend out to form a downward curved slope 27. The blade stabilizer circle 8 provides support to the blade unit 12 so that the slicing arms 19 remain sturdy and do not bend or wobble.

In addition, the blade unit 12 has a medial junction 22, wherein the metal slicing arms 19 may be affixed to one another or the cutter support rod 23 for stability during slicing. The bottom of the slicing arms 19 have sharpened blade edges 20 that make up the ventral edge 25. The slicing arms 19 have an identical radius that extends from the medial junction 22 to the blade edge lateral tip 26.

Regarding the construction of the blade unit 12; the preferred embodiment will have 8 slicing arms, though there may be from 4-12 slicing arms. The radius of the slicing arms in the preferred embodiment will be roughly 5" to allow cutting of a 10" cake, however they may be from 2.5" to 12". In one embodiment of the cutter 2, the blade unit 12 can be formed by eight half-moon shaped slicing arms 19 that are radially bound on one side to the supporting rod 23. The supporting rod is then anchored to the blade stabilizing circle 8 or the knob 14. In another embodiment, the blade unit 12 is formed by four slicing arms 19 with cut sections that radially interlock perpendicular to one another at their midsections, and are anchored directly to the blade stabilizing circle 8. In another embodiment, the blade unit 12 is comprised of four slicing arms 19 that are bent at ninety degree angles and anchored to the blade stabilizing circle 8 and support rod 23. Regarding the composition of the cutter 2, it is thought that all components including the blade stabilizing circle 8, the knob 14, and the slicing arms 19 can be formed from multiple types of material. While it is preferable that the blade unit 12 is made of a lightweight, yet sturdy material such as stainless steel, it and other components may also be made of other materials, which include but are not limited to; metal, plastic, synthetic polymers or hardened rubber. In other embodiments, the slicing arms may have specifically dull curved edges. Or covers applied to the curved edges to prevent injury while using the invention. In yet another embodiment, the knob is detachable, so that one may stack multiples of this invention vertically. In yet another embodiment, the knob is an embeddable handle that can be raised and lowered in order to employ the cutter.

In the preferred embodiment, the alignment tray 3 is a solid disk that provides a protective surface on which to cut the cake, as well as a guide for cutting even slices. There are large circumference primary cut markers 27 that line the grasping edge 28 of the alignment tray 3 to denote primary cutting lanes. Further there are smaller circumference secondary cut markers 29 to denote secondary half-slice (non-marked) cutting lanes. The primary cutting lanes are marked with primary cutting lines 30, which, in combination, create a plurality of wedge patterns 31 are used to get a visual indication of the size of the slices that the cutter 2 will make. The primary cutting lines also converge at the alignment tray center 32. The alignment tray center 32 allows one to visually estimate the ideal central placement of a cake before cutting. In addition, there are a plurality of a circular outlines 33 at different radial distances (at a 1" separation from each other) from the alignment tray center 32 used for aligning cakes of different sizes when placed on the alignment tray 3. Importantly, the furthest circular outline 34 will roughly have the same radii as measured form the alignment tray center 32 as a slicing arm 19.

In another embodiment, the alignment tray may have separation distances for the circular outlines of 0.5" to 2 inches". Separation distances smaller or larger than that will oppositely effect the utility of the device. In yet another embodiment, the rings in between the circular outlines may be of different colors to further aid alignment. In yet another embodiment, there may be a 2:1, 3:1 or 4:1 ratio of secondary markers, and they may be of different sizes or colors to facilitate identification. The alignment tray may be made of different types metals, plastic polymers, thermoconductive materials, synthetic rubbers or transparent moldable resins.

In the preferred embodiment, the holder tray 4 serves to support the alignment tray and connects to the holder 1 via one half of the second connection junction 6. It is at least the size of the alignment tray and may range from 3" to 13" radius. The holder tray 4 comprises a large flat alignment tray support area 35, that is wide enough to encompass the structural edge 36 of the alignment tray 3. Radial to the alignment tray support area 35 is a molded edge that forms the base lip 37 and base grasping edge 38. The base lip 37 attaches to the holder 1 for covered transportation or display of the invention. The base grasping edge 38 is used for separating the holder 1 from the holder tray 4 via the second junction connection 6 and also for carrying the invention. In another embodiment, the connection between the holder tray and the holder is mediated by clasps and binding elements present on the holder tray for clasping, rather than the second connection junction. In yet another embodiment the base lip may have a gasket. The holder tray may be made of different types metals, plastic polymers, thermoconductive materials, synthetic rubbers or transparent moldable resins.

In a preferred embodiment, the holder 1 is a single dome shaped piece of clear molded plastic comprising a cutter 2 encompassing display surface 39 with a center hollow cut out 9. The center hollow cut radius, as measured from the center of the cutter is roughly the size of the blade stabilizing circle. The display surface 39 rises slightly to form the hollow lip 40 at its apex. The hollow lip 40 comprises a ventral facing hollow edge 41 bounded by a perpendicular-medial facing hollow edge 42. The display surface also has a curved region 43 apparent as one moves towards the ventral portions of the holder. The display surface at the bottom of the holder 1 is molded to form the ventral holder lip 44 which fits with the holder base lip 37 comprising the second junction connection 6 of the invention. This circumference made by the ventral holder lip 44 is the ventral cut out 45, which encompasses is placed over the cutter 2. Finger indents 46 flank the hollow edge to allow one to grab the holder by the curved region 43 of the holder 1. A simple embodiment of a finger indent 46 has two lateral side walls 47 and a recessed mid-wall 48. In another embodiment, the holder is opaque and is composed of different colors. In yet other embodiments, the finger indents may extend from a couple inches to forming a grip-able ridge. In yet another embodiment, the holder is specifically conformed to the shape of the blades and as such is guided by the blades to the proper junction connections when the holder seals the cake inside. In yet, another embodiment grooves may be present in the top of the holder so that multiple devices can be stacked on one another securely.

In order to use the invention the alignment tray 3 may be placed on a secure surface (or the holder tray 4) and a cake 49 is placed upon it. The cake 49 can initially be placed upon the alignment tray 3 by visually using the primary cut markers 27. Often the cake will be misaligned with the circular outlines 33, such that uneven spacing will exist on the wedge patterns 31. In this case, it can be moved such that the cake side 50 is perpendicular to one of the circular outlines 33 and the cake edge 51 touches the circular outlines 33. It is contemplated that more than three circular outlines 33 can be used at nominal intervals as long as the furthest circular outline 34 has an identical diameter as the blade unit 12 on the cutter 2.

Once the cake 49 has been placed properly on the alignment tray 3, the cutter 2 is lifted above the cake and then rotationally-oriented using the knob 14 of the cutter 2 so that the slicing arms 19 are aligned with the primary cut markers 27. Then the cutter 2 is oriented in a horizontal plane such that the each of the blade edge lateral tips 26 aligns with the furthest circular outline 34 on the alignment tray 3. To slice the cake 49, the cutter 2 is pushed downward through the cake 49 until the blade edges meet the alignment tray 2.

The cutter 2 can then be retracted from the position of the primary cut markers 27 by using the knob 14, leaving large cake slices 52. If one wants smaller cake slices 53 then the cutter 2 it can be realigned by twisting the knob 14 until the slicing arms 19 align with the secondary cut markers 28 on the alignment tray 3. The knob 14 is then forced downward through the cake until the slicing arms 19 reaches the alignment tray 2, creating smaller slices of cake 53.

After cutting the cake, one may serve the cake or alternatively one may re-seal the cake with the holder 1. Resealing the cake lets one preserve freshness and also allows one to attractively display the cake to others, or perhaps transport the sliced cake in a secure manner. In order to re-seal the cake, one uses the finger indents 46 on the holder display surface 39 to easily guide the holder over the cutter and snaps the holder to both the cutter and the holder tray via the first 5 and second 6 connection junctions.

In one embodiment, the slope 27 of the slicing arms 19, performs several functions. First, the slope 27 of the slicing arms 19 acts as a guide for the holder to form both the first connection junction 5 between the holder 1 and the cutter 2 at the edge of the blade stabilizer circle 8 of the cutter 2 and the holder center hollow cut out 9. Second, it helps form second junction between the ventral lip 10 of the holder 1 and the lateral lip 11 of the holder tray 4. Thus a person needs not spend an extensive amount of time lining up the edge of the blade stabilizer circle 8 of the cutter 2 and the holder center hollow cut out 9. Third, 2) The slicing arms 19 extend beyond the boundary of the cake, they protect the holder 1 from incidentally touching the cake when sealing it. This allows one to have a smaller volume of holder 1, relative to the size of the cake an advantage for maximum display purposes and aesthetics.

In order to seal the first connection junction 5 one must engage parts of the holder 1 and cutter 2. The hollow lip 40 of the holder comprises a ventral facing hollow edge 41 bounded by a perpendicular-medial facing hollow edge 42, wherein there may be a holder dorsal gasket 53 position between them. Similarly on the cutter 2 at the edge of the blade stabilizer circle 18, there is a lateral facing edge 56 and medio-dorsal edge 55, wherein there may be a cutter gasket 54 positioned between them. Moving the holder 1 ventrally, engages the cutter 2 and holder 1 parts of the first connection junction 5 and forms a seal.

There are two options for disengaging the connection junctions 5, 6 dependent on the desire of the operator. For example, one may choose to disconnect the second junction connection 6 only. This would be done by lifting the cutter 2 using the knob 14. In this scenario the first connection junction 5 remains engaged, but the second connection junction 6 does not. This results in lifting both the cutter 2 and holder 1 from the cake simultaneously, leaving only a sliced cake. Alternatively one may use the finger indents 46 of the holder 1, and simultaneously depress the dorsal surface 17 of the blade stabilizing circle 8. This creates a fulcrum that disconnects both the first junction 5 and the second junction 6 simultaneously, leaving the cutter incorporated with the cake for display or serving.

Additionally, it is also contemplated that the secondary cut markers 28 may be used to manually guide the cutting of only some slice and not all slices. Thus, the size of the cake slice is manually determined by the operator using by visually approximating the relationship between the slicing arms 19 and primary 27 or secondary cut markers 28. For example, a large slice of cake 52 may be cut into a smaller slice of a cake 53 using a knife 57, by aligning the knife 57 with the secondary cut markers 28 from the alignment tray 3.

I claim:

1. A cake slicing device comprising:
    a cutter,
    a holder, and
    a holder tray,
    wherein said holder has a center hollow cut out with a hollow lip and a display surface that is transparent, said holder additionally comprising a ventral holder lip that operationally attaches to said holder tray,
    wherein said cutter is comprises of a plurality of non-detachable slicing arms and a blade stabilizing circle,
    wherein said blade stabilizing circle is ventrally attached to said non-detachable slicing arms and comprises a dorsal face and a radial edge, and
    wherein said radial edge of said blade stabilizing circle is operationally attached to said hollow lip of said holder.

2. The cake slicing device of claim 1, wherein said blade stabilizing circle has a knob attached to said dorsal face of said blade stabilizing circle.

3. The cake slicing device of claim 2, wherein said radial edge comprises a lateral facing edge and a mediodorsal edge.

4. The cake slicing device of claim 3, wherein a cutter gasket sits between said lateral facing edge and said mediodorsal edge.

5. The cake slicing device of claim 4, wherein said lateral facing edge and said mediodorsal edge operationally interact with a ventral edge and a perpendicular-medial edge of said holder.

6. The cake slicing device of claim 5, wherein a holder gasket sits between the ventral edge and the perpendicular-medial edge.

7. The cake slicing device of claim 1 further comprising a removable alignment tray, wherein said alignment tray has evenly spaced primary cutting lines that operationally align with said slicing arms.

8. The cake slicing device of claim 7, wherein primary markers are apical to said primary cutting lines.

9. The cake slicing device of claim 8, wherein second markers lie halfway between said primary markers.

10. The cake slicing device of claim 9, wherein circular outlines intersect said primary cutting lines.

11. The cake slicing device of claim 10, wherein said circular outlines are evenly spaced from one another by one inch.

* * * * *